Jan. 29, 1929.  1,700,229
H. J. LOUNSBURY
FRICTION SHOCK ABSORBING MECHANISM
Filed Nov. 2, 1927  2 Sheets-Sheet 2
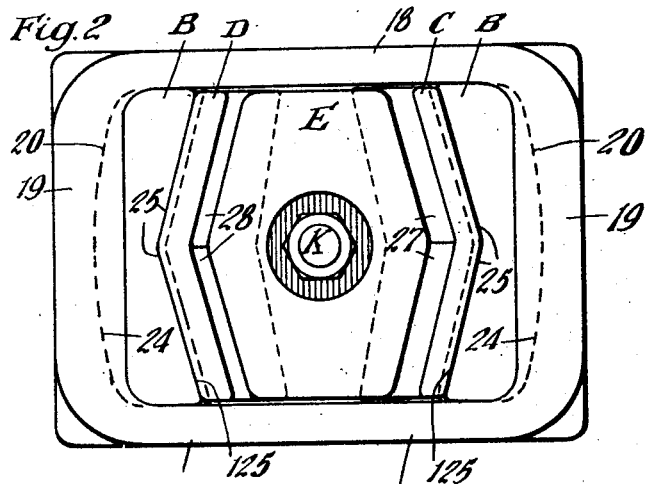
Inventor
Harvey J. Lounsbury
By George L. Haight
His Atty.
Witness
Wm. Geiger Patented Jan. 29, 1929.

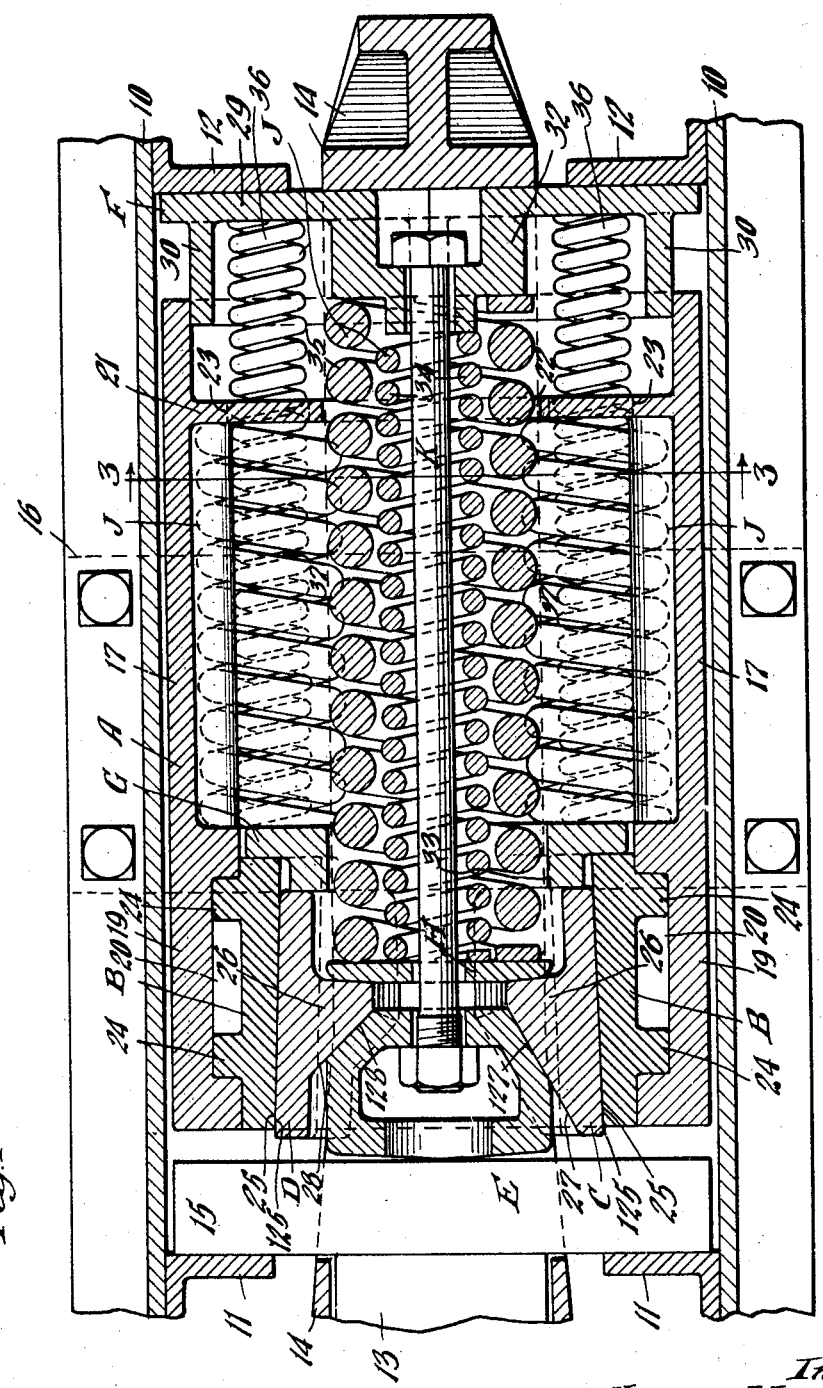

1,700,229

UNITED STATES PATENT OFFICE.

HARVEY J. LOUNSBURY, OF GLEN ELLYN, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed November 2, 1927. Serial No. 230,433.

This invention relates to improvements in friction shock absorbing mechanisms.

One object of the invention is to provide a friction shock absorbing mechanism, especially adapted for railway draft riggings, having high ultimate capacity and preliminary free spring action to absorb the lighter shocks, including a friction shell, co-operating friction elements and spring resistance means, wherein the friction system and shell are relatively movable, relative movement of the parts being opposed by the entire spring resistance means, which comprises a plurality of spring elements, certain of which also afford the preliminary spring resistance.

Another object of the invention is to provide a friction shock absorbing mechanism of the character indicated, including a combined spring cage and friction shell having a friction system co-operating with the shell section thereof, the movement of the friction system with respect to the shell being resisted by spring means, including spring elements which are interposed between the friction means and a preliminary spring follower which has limited movement with respect to the cage to provide substantially free spring action during a portion of the compression stroke, followed by high frictional resistance during the remainder of the compression stroke.

A more specific object of the invention is to provide a friction shock absorbing mechanism of the character indicated, including a combined spring cage and friction shell, the cage having the friction shell section formed at one end thereof and being open at the other end, friction shoes co-operating with the shell, wedge means engaging the shoes and a spring follower at the open end of the cage, the spring fellower having limited movement inwardly of the cage and being arrested in its inward movement by engagement with abutment means on the cage, and spring resistance means opposing inward movement of the friction shoes, said spring resistance means including a plurality of elements, certain of which are interposed between the friction shoes and the abutment means on the cage, and the remainder of which extend through the abutment means and are interposed between the friction shoes and the spring follower.

Other and further objects and advantages of the invention will more fully and clearly appear from the description and claims hereinafter following.

In the drawings, forming a part of this specification, Figure 1 is a horizontal, longitudinal, sectional view of a portion of a railway draft rigging showing my improvements in connection therewith. Figure 2 is a front end elevational view of the shock absorbing mechanism proper. Figure 3 is a vertical, transverse, sectional view, corresponding substantially to the line 3—3 of Figure 1, and Figure 4 is a longitudinal, vertical, sectional view of the rear end portion of the shock absorbing mechanism, said section corresponding substantially to the line 4—4 of Figure 3.

In said drawings 10—10 indicate channel shape center or draft sills of a railway car underframe, to the inner sides of which are secured the usual front stop lugs 11—11 and rear stop lugs 12—12. The inner end portion of the draw bar is designated by 13, to which is operatively connected a yoke 14 of well known form. The shock absorbing mechanism proper and a front main follower 15 are disposed within the yoke. The yoke and the parts therewithin are supported in operative position by a detachable saddle plate 16 secured to the draft sills.

The improved shock absorbing mechanism proper comprises broadly, a combined friction shell and spring cage member A, the shell section being provided with liners B—B; two friction shoes C and D; a main wedge E; a preliminary spring follower F; a main spring follower G; a spring follower disc H; a main spring resistance J; and a retainer bolt K.

The combined spring cage and friction shell is in the form of a substantially rectangular box-like casting, as most clearly illustrated in Figures 1, 2 and 3. The combined friction shell and spring cage casting A has longitudinally disposed vertical spaced side walls 17—17, and horizontally disposed spaced top and bottom walls 18—18. At the forward end of the casting A, the said walls 17 are inwardly thickened as indicated at 19. The thickened wall sections 19 of the cage A are recessed on the inner sides thereof, as indicated at 20, for a purpose hereinafter described. As clearly shown in the drawings, the casting A is open at the rear end and is provided with a transverse partition wall 21 adjacent the open end thereof. The partition wall 21 is provided with spaced openings 22 and 23, adapted to accommodate certain of the members of the spring resistance means, as hereinafter more fully explained. At the forward end the casting A is provided with interior detachable liners B. Each of the liners B is in the form of a substantially rectangular heavy plate. On the outer side, each liner B is provided with a pair of spaced vertical ribs 24—24, which are adapted to seat within the corresponding recess 20 at the same side of the casting A. As clearly shown in Figure 1, the ribs 24 are spaced apart such a distance that they will engage the front and rear end walls of the corresponding seat 20, thereby preventing longitudinal displacement of the liner B with respect to the casting A. It will be evident that the two liners B are thus held assembled with the casting A and maintained in position against longitudinal movement with respect to the casting A and together define the friction shell section of the casting A. On the inner side, each liner B is provided with a longitudinally disposed friction surface 25 of V-shaped section. The opposed friction surfaces 25 of the two liners B are preferably converged inwardly of the mechanism. It is also pointed out that the liners protrude inwardly from the enlarged sections 19 of the side walls of the casing, thereby presenting flat abutment faces at the inner ends thereof, to limit outward movement of the main spring follower G, as hereinafter pointed out.

The friction shoes C and D, which are disposed at opposite sides of the friction shell, are of similar design, except as hereinafter pointed out. Each of the friction shoes is provided with a longitudinally disposed friction surface 125 on the outer side thereof, adapted to co-operate with the friction surface 25 of the corresponding liner B. The friction surfaces 125 of the shoes C and D are also of V-shaped section, so as to interfit with the friction surfaces of the liners and prevent relative vertical displacement of these parts while permitting relative longitudinal movement thereof. On the inner side, each shoe C and D is laterally enlarged as indicated at 26. The enlargement 26 of each shoe is provided with a wedge face on the forward side thereof, the wedge face of the shoe C being indicated by 27 and that of the shoe D being indicated by 28. The wedge face 27 of the shoe C is preferably disposed at a relatively keen wedge acting angle with respect to the longitudinal axis of the mechanism, while the wedge face 28 of the shoe D is disposed at a relatively blunt releasing angle with respect to said axis. The two wedge faces 27 and 28 are preferably of V-shaped section so as to interfit with the corresponding wedge faces of the wedge block E.

The wedge block E has a curved outer end face, as most clearly shown in Figure 1, which bears directly on the inner side of the spring follower 15. At the inner end the wedge block E is provided with a pair of wedge faces 127 and 128 on the opposite sides thereof, adapted to co-operate with the wedge faces 27 and 28 of the friction shoes C and D. The wedge face 127 is disposed at the same angle as the wedge face 27 and is of V-shaped section so as to interfit with said face. The wedge face 128 of the block E is also disposed at the same angle as the wedge face 28 of the shoe D and is a V-shaped section so as to interfit with this latter face. It will be evident that by the arrangement of inter-engaging V-shaped wedge faces on the wedge block and friction shoes, and the inter-engaging V-shaped friction surfaces on the friction shoes and liners, relative vertical displacement of these parts will be prevented and movement of the wedge block and friction shoes will be confined to a direction longitudinal of the mechanism, thereby maintaining the friction system spaced from the top and bottom walls of the casing A and preventing wear of these walls.

The preliminary spring follower F comprises a substantially rectangular plate-like member 29, having vertically disposed forwardly extending spaced side flanges 30—30 and horizontally disposed spaced top and bottom flanges 31—31. The preliminary spring follower F cooperates with the rear stop lugs 12 in the manner of the usual rear follower. As most clearly illustrated in Figures 1 and 4, the preliminary spring follower F is telescoped within the rear end of the casing A, the flanges 30 and 31 of the spring follower slidably fitting the walls of the casing A. The preliminary spring follower is also provided with an inwardly projecting substantially cylindrical hollow boss 32, which forms an abutment for one of the spring elements of the spring resistance means J. The flanges 30 and 31 of the preliminary spring follower F are of such a length that they will engage with the transverse partition wall upon the preliminary spring follower being forced inwardly of the casing A to an extent to engage the plate-like section 29 thereof with the rear end of the casing. It will be evident that the preliminary spring follower F thus has limited relative movement with respect to the casing A.

The main spring follower G is in the form of a substantially heavy rectangular plate fitting loosely between the enlarged portions 19 of the side walls 17 of the casing A. As most clearly shown in Figure 1, the main spring follower G is provided with a central opening 33, adapted to freely accommodate one of the spring elements of the spring resistance means. The spring follower G is also provided with a forwardly projecting annular flange surrounding the opening 33 and engaging the inner ends of the friction shoes C and D. The spring follower plate G is of such a width as to overhang the inner ends of the liners B and is thus limited in its outward movement.

The spring resistance means J preferably comprises a plurality of spring elements, each composed of a pair of coils. As most clearly shown in Figures 1 and 3, the spring resistance means J comprises a central spring element composed of a relatively light inner coil 34 and a relatively heavier outer coil 35. The central spring element is surrounded by four additional spring elements which are disposed at the four corners of the casing A. Each of the additional spring elements includes an inner light coil 36 and a relatively heavier outer coil 37. The two coils 34 and 35 of the central spring resistance element have their opposite ends bearing directly on the spring follower disc H and the front abutment face of the hollow boss 32 on the preliminary spring follower. As clearly shown in Figure 1, the spring follower disc H is interposed between the spring resistance and the enlargements on the two friction shoes. The central spring element of the spring resistance J extends through the partition wall 21 of the casing A, so as to have free movement through the opening 22. This spring element also extends through the opening 33 of the main spring follower G and has free movement therethrough. The outer coils 37 of the four additional spring resistance elements are interposed between the partition wall 21 and the main spring follower G, while the inner coils 36 are interposed between the main spring follower G and the preliminary spring follower F, extending freely through the openings 23 of the partition wall 21.

The entire mechanism is held assembled and of over all uniform length by means of a retainer bolt K which is anchored to the preliminary spring follower F and the wedge block E, respectively. The head of the bolt is accommodated within the hollow boss 32 of the preliminary spring follower F, and the nut of the bolt is accommodated within an opening in the wedge block E. Compensation for wear of the various friction and wedge faces of the mechanism is had by the expansive action of the central element of the spring resistance means, which is preferably placed under an initial compression when the mechanism is assembled. It will be evident that due to the expansive action of this spring resistance element, the tendency will be to at all times force the shoes outwardly against the wedge faces of the wedge block, and that due to the wedging action of the wedge block the friction surfaces of the shoes will be forced into intimate contact with the friction surfaces of the two liners.

In assembling the mechanism, the four outer coils 37 of the spring resistance means are first disposed within the casing A. The main spring follower and the liners B are next placed in position. The central spring element comprising the coils 34 and 35, and the four coils 36 are next inserted within the casing A, the coils 36 being inserted through the rear end of the casing, the friction shoes, wedge block and preliminary spring follower F are then placed in position and anchored to each other by the retainer bolt K.

The operation of my improved shock absorbing mechanism during a compression stroke is as follows: The front follower 15 and the casing A will be moved relatively toward each other, thereby forcing the wedge block E against the wedge faces of the friction shoes C and D. Due to the relatively keen engaging faces of the wedge block and the friction shoe C, a lateral pressure will be set up, forcing the friction shoes into tight frictional engagement with the friction surfaces of the liners B. Due to the friction thus created, the casing A will be forced inwardly of the mechanism substantially in unison with the main follower 15, thereby moving the casing A and the preliminary spring follower F relatively to each other. During this action, the central spring resistance element, including the coils 34 and 35, and the four coils 36 of the additional spring resistance elements, will be compressed. This action will continue until relative movement of the casing A and the preliminary spring follower F is limited by engagement of the spring follower F with the rear end of the casing A and engagement of the flanges of the spring follower with the partition wall 21. It is pointed out that during the preliminary spring action produced by the relative movement of the casing A and the preliminary spring follower F, there is substantially no movement produced between the friction shoes and the friction surfaces of the liners. As soon as relative movement of the casing and the preliminary spring follower has been arrested, the friction shoes C and D will be forced to move inwardly of the casing A during the continued relative movement of the main follower 15 and the casing A, compressing the central spring resistance element and the four additional springs 37. Due to the great capacity of the heavy coils 37 and the central spring element of the spring resistance, the shock absorbing capacity of the mechanism is greatly increased during the last part of the compression stroke, the frictional resistance between the shoes and the liners adding greatly to the shock absorbing capacity of the mechanism.

During release of the mechanism, upon the actuating force being reduced, the expansive action of the central spring elements 34 and 35 and the expansive action of the coils 36 will effect restoration of the preliminary spring follower F to its normal position. The expansive action of the coils 36 and 37 will return the spring follower G to its normal outward position, movement of the same being arrested by engagement with the inner end of the liners B. The central element comprising the springs 34 and 35, will force the friction shoes and wedge outwardly until movement thereof is limited by the retainer bolt K.

While I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with a friction shell having interior friction surfaces at one end thereof; of a preliminary spring follower co-operating with the other end of the shell and having limited movement inwardly of the shell, said shell being provided with abutment means; a friction system, including lateral pressure creating means, said friction system being movable inwardly of the shell; a spring resistance means opposing inward movement of the friction system, said spring resistance means including a plurality of elements, certain of which bear on said abutment means of the shell and the remaining elements of which oppose relative movement of the shell and preliminary spring follower.

2. In a friction shock absorbing mechanism, the combination with a column element having longitudinally disposed friction surfaces at one end thereof, said column element having abutment means at the opposite end thereof; of a preliminary spring follower co-operating with the end of the column provided with abutment means; friction shoes co-operating with the friction surfaces of the column; lateral pressure creating means for forcing said shoes inwardly of the column and against the friction surfaces of the same; spring resistance means interposed between the friction shoes and the abutment means and additional spring resistance means interposed between the friction shoes and the preliminary spring follower.

3. In a friction shock absorbing mechanism, the combination with a combined spring cage and friction shell, the friction shell being formed at one end thereof and having opposed friction surfaces; of a preliminary spring follower co-operating with the other end of said combined cage and shell, said spring follower having limited movement inwardly of said combined cage and shell; spring abutment means on the cage; friction shoes co-operating with the shell; a wedge engaging the shoes; a spring follower also engaging the shoes; spring resistance means within the cage interposed between the spring follower and the spring abutment means of the cage; and additional spring resistance means extending freely through the spring follower, said last named spring resistance means being interposed between the preliminary spring follower and the shoes.

4. In a friction shock absorbing mechanism, the combination with a spring cage provided with a friction shell section at one end thereof, said cage being open at the opposite end and provided with a transverse partition wall spaced inwardly from said open end; of friction shoes co-operating with the shell friction surfaces; wedging means interposed between said shoes; a spring follower co-operating with the shoes; a preliminary spring follower telescoped within the open end of the cage and having its movement limited inwardly of the cage; a central spring resistance element; and spring resistance means disposed about said element, said spring resistance means being interposed between the spring follower and the partition wall, and said central spring element extending freely through the partition wall and being interposed between the shoes and the preliminary spring follower.

5. In a friction shock absorbing mechanism, the combination with a spring cage having a friction shell section at one end thereof, said cage having abutment means thereon; of a preliminary spring follower co-operating with the other end of the cage and having limited movement with respect to the cage; a friction system co-operating with the friction shell, said system including a pressure transmitting spreading means; spring resistance means opposing relative movement of said friction system and shell, said spring resistance means including a central spring element and additional spring elements surrounding said central element, said additional spring elements each including two spring members, one of the members of each additional spring element being interposed between the abutment means of the cage and the friction system, and the remaining members of said additional elements and the central element being interposed between the preliminary spring follower and the friction system.

6. In a friction shock absorbing mechanism, the combination with a rectangular cage having a friction shell section at the forward end thereof, provided with opposed friction surfaces, said cage being open at the rear end thereof and provided with abutment means adjacent said open end; of a preliminary spring follower having limited movement with respect to the cage, said spring follower being telescopically received by the open end of the cage; a friction system co-operating with the friction shell, said friction system including friction shoes and a pressure transmitting spreading element; spring resistance means opposing relative movement of said friction system and cage, said spring resistance including a central element interposed between the friction shoes and the preliminary spring follower; and four additional spring elements disposed about said central element and located in the corners of the rectangular cage, each of said additional spring elements including a central spring element interposed between the friction shoes and the preliminary spring follower, the outer members of the four additional spring elements being interposed between the friction shoes and the abutment on the spring cage.

7. In a friction shock absorbing mechanism, the combination with a spring cage having a friction shell member at one end thereof, said cage having abutment means at the other end thereof; of a preliminary spring follower co-operating with the last named end of the cage and having limited movement with respect to the cage; a friction system co-operating with the friction shell; spring resistance means opposing relative movement of the friction system and shell, said spring resistance means including a central spring element and four additional spring elements disposed about said central element, each of said spring elements comprising inner and outer coils, the inner and outer coils of the central spring element being interposed directly between the preliminary spring follower and the friction system, the outer coils of the four surrounding elements being interposed between the abutment means on the cage and the friction system, and the inner coils of said last named elements being interposed between the friction system and the preliminary spring follower.

8. In a friction shock absorbing mechanism, the combination with a rectangular casing having a friction shell section at one end thereof, provided with opposed interior friction surfaces, the other end of the casing being open; of a preliminary spring follower co-operating with the open end of the casing and having its movement with respect to the casing limited by engagement therewith; a pair of friction shoes co-operating with the friction shell surfaces; a wedge block having wedging engagement with the friction shoes; spring resistance means interposed between the friction shoes and the preliminary spring follower, said spring resistance means including inner and outer coils; four additional spring resistance elements disposed about said central spring resistance means, each of said spring resistance elements being disposed in a corner of the rectangular casing and including inner and outer spring members, the inner spring members having their rear ends bearing directly on the preliminary spring follower and the front ends of the inner and outer members bearing directly on spring follower means co-operating with the friction shoes, said spring follower means being provided with an opening through which the central spring resistance means extends; and abutment means on the casing co-operating with the rear ends of the outer members of the spring resistance elements.

In witness that I claim the foregoing I have hereunto subscribed my name this 29th day of October, 1927.

HARVEY J. LOUNSBURY.